INVENTOR.
RALPH HANNA
BY Alfred L. Patmore, Jr.
ATTORNEY

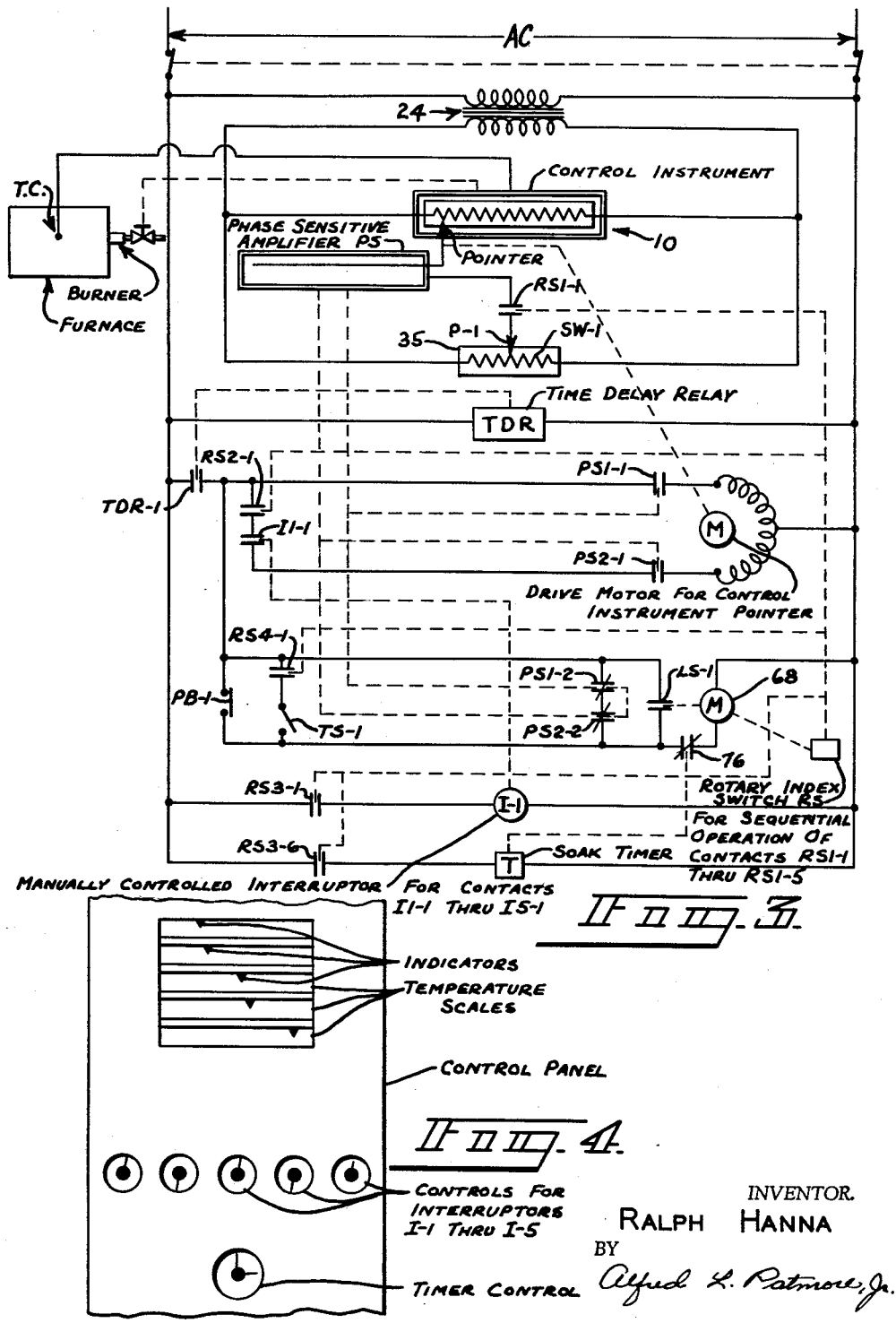

United States Patent Office 3,043,517
Patented July 10, 1962

3,043,517
PROGRAM CONTROLLER
Ralph Hanna, Toledo, Ohio, assignor, by mesne assignments, to Midland-Ross Corporation, Cleveland, Ohio, a corporation of Ohio
Filed July 6, 1959, Ser. No. 825,320
13 Claims. (Cl. 236—46)

This invention relates to an improved program controller for regulating a variable and more particularly to a program controller for regulating temperature in a furnace to schedule a desired heat-treating cycle.

The present invention provides an improved program controller for regulating a variable such as temperature, pressure, dew point, or atmosphere gas within a furnace or other enclosed zone to schedule a predetermined cycle over a period of time. The new controller has a number of advantages over those known in the art. For example, the new controller can employ an almost unlimited number of control points and can provide an almost unlimited variation in the rate at which each sequential control point is approached from a prior one. The number of control points can be increased simply by adding relatively low cost components to the controller and the rates of approach can be varied even while the controller is operating by a simple adjustment of rate control components. In addition, one of more control points in a cycle can be skipped, as desired. Furthermore, a preset cycle is only interrupted by a power failure because, when power is again available, the controller will merely resume the cycle at the point where the power failure occurred.

It is, therefore, a principal object of the invention to provide an improved program controller having the advantages outlined above.

Other objects and advantages of the invention will be apparent from the following detailed description of a preferred embodiment thereof, reference being made to the accompanying drawing, in which:

FIG. 3 is a diagrammatic view of a portion of the control circuit shown in FIG. 1 with related components thereof connected by dotted lines, and with suitable legends applied to facilitate an understanding of the invention from the drawing alone; and FIG. 4 is a fragmentary view of a typical control panel for use in connection with the control circuit of the invention.

Figure 1:
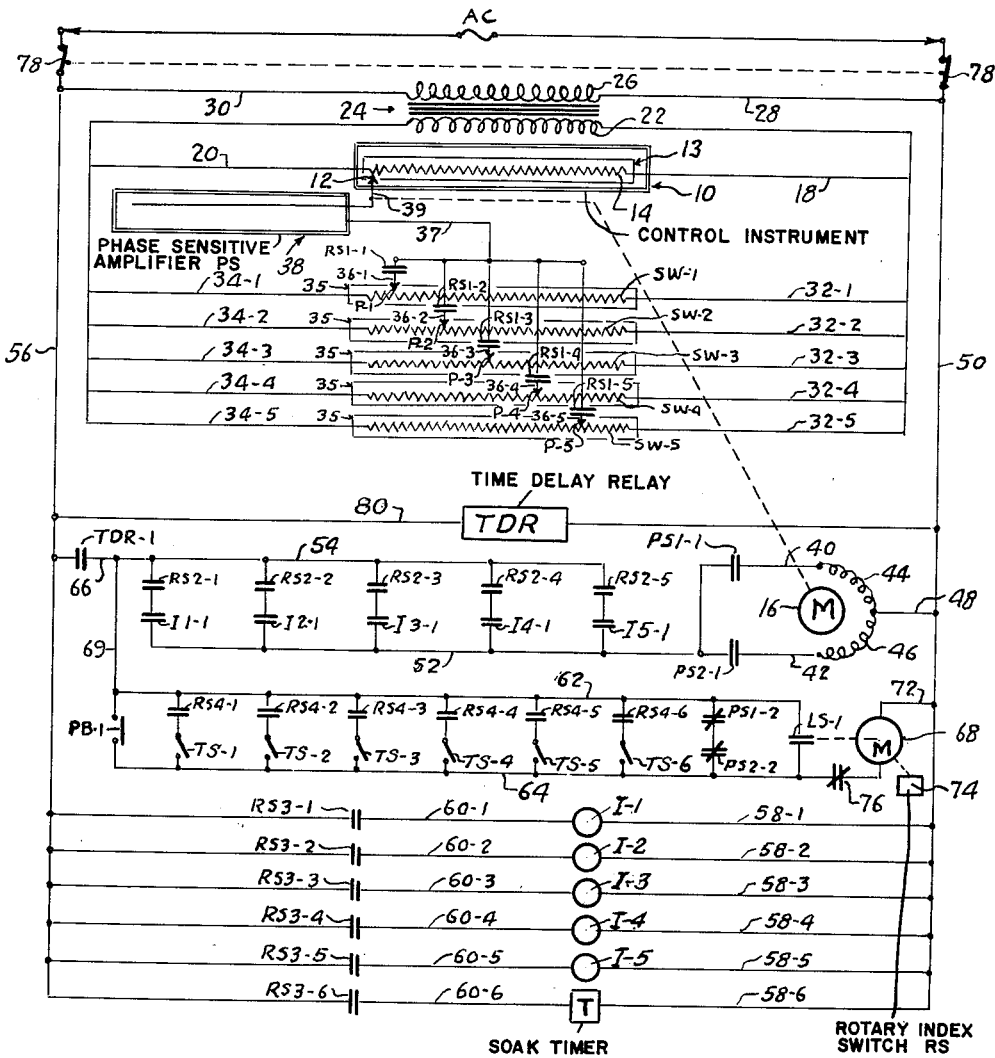
FIG. 1 is a diagrammatic view of a control circuit according to the invention.

A program controller according to the invention includes an instrument for measuring and maintaining constant a given variable, a plurality of slide-wire devices for changing the value at which the variable is maintained, and a plurality of rate control devices for regulating the rate at which the variable is changed from one value to another. More specifically, as shown in FIGS. 1 and 3, the controller includes a control instrument indicated generally by the numeral 10 for measuring and controlling a variable, temperature in this instance, which is to be regulated according to a desired cycle or pattern. The instrument 10 includes a first indicator 12 set at a temperature on a temperature scale 13 which is desired from time to time during a cycle in a furnace or a zone thereof. When the temperature at which the indicator 12 is set is above the actual temperature in the furnace or zone, a source for supplying heat to the furnace or zone will be actuated by the instrument 10 until the temperature reaches the desired value and an indicating pointer (not shown) which indicates the measured temperature in the furnace or zone reaches a position in alignment with the indicator 12. On the other hand, if the temperature in the furnace or zone is above that at which the indicator 12 is set, the heat source will be inactivated by the instrument 10 until the temperature falls to that desired. The operation of the instrument 10 to control the temperature within the furnace or zone to the value set from time to time by the indicator 12 is known in the art. In simple D.C. instruments of this type, a signal from a thermocouple within the furnace or zone is opposed in a Wheatstone bridge against a potential drop along a slide-wire to a pointer which is movable relative to the slide-wire with the indicator 12. A galvanometer in the bridge circuit deflects one way when temperature is too low, and another way when too high. The galvanometer deflection direction is sensed and utilized to control heat. Suitable control instruments for performing this function are commercially available; one is illustrated in FIG. 73, page 2061, and described in detail on pages 2060 and 2061 of Chemical Engineers' Handbook, second edition, McGraw-Hill Book Co., Inc., New York, New York, 1941.

The instrument 10 in addition to the components necessary to perform the previously described functions, includes a primary slide-wire 14 which the indicator 12 contacts as a pointer, and a first pointer drive motor 16 to drive the indicator pointer 12 along the primary slide-wire 14.

The slide-wire 14 is connected by lines 18 and 20 across a secondary coil 22 of an A.C. transformer 24, the primary coil 26 of which is connected to a suitable source of current, designated AC, by lines 28 and 30. Five secondary slide-wires (FIG. 1), designated SW1–SW5 (FIG. 1), which are identical with the primary slide-wire 14, are also connected across the secondary coil 22 of the A.C. transformer 24 by lines 32–1 to 32–5 and 34–1 to 34–5, respectively. The secondary slide-wires, which are thus placed in parallel with the primary slide-wire 14, have temperature scales 35 identical to the scale 13 for the slide-wire 14. Each of the slide-wires SW1–SW5 has a second, manually movable pointer P–1 to P–5, respectively, which is connected through lines 36–1 to 36–5, respectively, when contacts RS1–1 to RS1–5, respectively, in these lines are closed, and a line 37 to one side of a phase sensitive amplifier 38. The first pointer 12 is connected to the other side of the phase sensitive amplifier 38 through a line 39.

Each of the pointers P–1 to P–5 can be placed on its respective slide-wire SW1 to SW5 at a temperature value, as indicated on the scales 35 (see, also, FIG. 4), which is to be obtained in the furnace or zone. When the temperature in the furnace or zone reaches that set by one of the pointers, the next pointer becomes operative and the temperature in the furnace or zone then approaches that set by the next pointer. Toward this end, the amplifier 38 controls two normally open relay contacts PS1–1 and PS2–1 in lines 40 and 42, respectively, which contacts control the supply of current to a forward winding 44 and a reverse winding 46 of the drive motor 16. The windings are connected to the source of alternating current A.C. through lines 48 and 50 and through lines 52, 54, 66 and 56.

As will subsequently be discussed in more detail, the contacts RS1–1 to RS1–5 are closed sequentially during the programming of a heating cycle. In a common situation, where work is charged into a cold furnace and a heating cycle within the furnace is then programmed, initially the first pointer 12 will be at the extreme left of the slide-wire 14, and the contact RS1–1 will be closed, while the contacts RS1–2 to RS1–5 are open. In this condition, the pointer 12 is farther to the left (FIG. 1) on its slide-wire 14 than is the operative pointer P–1, or, stated in terms of the respective indicia, the pointer 12 indicates a temperature lower than that indicated by the pointer P–1. In terms of the cycle programmed by the apparatus, the pointer P–1 indicates a maximum temperature to which the cold furnace is to heated at a first heating rate (see FIG. 2). Referring again to FIG. 1, since the same voltage is applied to the slide-wire SW1 and to the slide-wire 14, different signals are supplied to the phase sensitive amplifier 38 through the lines 37 and 39. In response to the different signals, the amplifier 38 generates a control signal which opens a normally closed contact PS1–2 and closes the contact PS1–1 in the line 40 to enable a flow of current in the forward winding 44 of the drive motor 16 to drive the pointer 12 to the right, or toward a position at which the signals in the lines 37 and 39 are balanced, whenever there is a closed circuit between the lines 52 and 54 and contacts TDR–1 are closed. As is subsequently discussed, the contacts TDR–1 are normally closed during a heating cycle. A wiring diagram of the phase sensitive amplifier 38 is found in FIG. 11 of an undated publication entitled "077 Electronic Temperature Controller, Instructions for Installation—Operation—Maintenance, Number 15038G," Minneapolis-Honeywell Regulator Company, Industrial Division, Philadelphia 44, Pennsylvania.

While the contacts RS1–1 are closed, so that the phase sensitive amplifier 38 compares the signal from the preset position of the pointer P–1 with the signal from the instantaneous position of the pointer 12, the contacts RS2–1 are also closed, and the contacts RS2–2 through RS2–5 are open, as will subsequently be explained in detail. Accordingly, current can flow between the lines 52 and 54 to the forward winding 44 of the drive motor 16 only when contacts I1–1 are closed. The contacts I1–1 are controlled by an interruptor I–1 which is connected by a line 58–1 to the line 50, and by a line 60–1 to the line 56. When the contacts RS1–1 and RS2–1 are closed, contacts RS3–1 in the line 60–1 are also closed so that the interruptor I–1 is energized, and interruptors I–2 through I–5 and a timer T, which are connected to the line 50 by lines 58–2 through 58–6, in that order, and to the line 56 by lines 60–2 through 60–6, in that order, are de-energized because contacts RS3–2 through RS3–6 are open. The interruptor I–1, like the interruptors I–2 through I–5, is a variable rotary timer switch which closes operatively associated contacts a predetermined percentage of a given time interval, depending upon a manual setting. Manual controls for these interruptors are designated by legend in FIG. 4, which shows a fragment of a typical control panel for a circuit according to the invention. For example, the interruptor I–1 may be set so that, when energized, it closes the contacts I1–1 for 40 percent of the time, and opens the contacts for 60 percent of the time. The motor 16 is then driven 40 percent of the time, and the pointer 12 approaches a position on its associated slide-wire 14 corresponding with the preset position of the pointer P–1 on its associated slide-wire SW1 at what may be denominated a 40 percent rate, or at 40 percent of the rate at which it would approach such position if the motor 16 were driven constantly.

When the instantaneous position of the pointer 12 relative to its associated slide-wire 14 corresponds with the preset position of the pointer P–1 on its slide-wire SW1, the phase sensitive amplifier senses balanced signals in the lines 37 and 39; no signal is generated by the amplifier 38 when it senses a balanced condition, and, as a result, the amplifier contacts PS1–1 open, while the normally closed contacts PS1–2 close. Normally closed contacts PS2–2 are also closed, and a circuit is completed from the current source through the line 56, lines 66 and 69, and lines 62 and 64 to a rotary switch indexing motor 68, and through a line 72 and the line 50 back to the current source. The motor 68 drives a rotary index switch 74 to open the contacts RS1–1, RS2–1 and RS3–1, and to close the contacts RS1–2, RS2–2 and RS3–2. The signal to the phase sensitive amplifier 38 from the line 37 then depends upon the position of the pointer P–2 on its slide-wire SW2, and since this pointer is preset farther to the right, or at a higher temperature, than the pointer P–1, and since the pointer 12 is instantaneously at a position on its slide-wire 14 corresponding with the preset position of the pointer P–1, the phase sensitive amplifier 38 will sense a condition of unbalance in the same direction as previously and will close the contact PS1–1 to enable energizing of the forward winding 44 of the motor 16 and open the contact PS1–2 to deenergize the motor 68. The pointer 12 will then be driven to the right at a rate dependent upon the percentage of the time that the contact I2–1 is closed by the interruptor I–2 until the phase sensitive amplifier 38 again senses a condition of balance in the signals received from the lines 37 and 39. When the balanced condition is sensed, the contacts PS1–1 are opened, and the contacts PS1–2 are closed to complete a circuit to the motor 68 and again drive the rotary index switch 74. This opens the contacts RS1–2, RS2–2 and RS3–2, and closes the contacts RS1–3, RS2–3 and RS3–3. The pointer 12 is then driven to the right until it reaches a position corresponding with the preset position of the pointer P–3, when the index switch 74 is again driven to open the contacts RS1–3, RS2–3 and RS3–3 and to close the contacts RS1–4, RS2–4 and RS3–4, and the pointer 12 is driven to the right to a position corresponding to the preset position of the pointer P–4. The index switch 74 is then driven again to make the pointer P–5 operative relative to the amplifier 38, and the pointer 12 is driven to the right to a position corresponding with the preset pointer P–5. The rate at which the pointer 12 approaches each of the positions corresponding with the preset positions of the pointers P–3, P–4 and P–5 is determined by the setting of the correspondingly numbered interruptor in the manner previously described. In the heating cycle of FIG. 2, the heating rates represented by the lines P–1 to P–2 and P–3 to P–4 are much slower than the rates represented by the lines 0 to P–1, P–2 to P–3, and P–4 to P–5, so that the slopes of the former are much less than the slopes of the latter lines. When the pointer 12 reaches a position corresponding with the preset position of the pointer P–5, the index switch 74 is again driven to open contacts RS2–5 and RS3–5, and to close contacts RS3–6 so that the timer T is energized.

Figure 2:
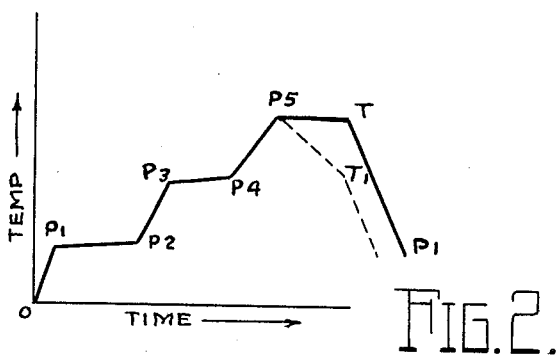
FIG. 2 is a graphic representation of a heating cycle which can be programmed by operation of the circuit shown in FIG. 1.

When the timer T is energized, normally closed contacts 76 are opened to de-energize the motor 68, but the contacts RS1–5 remain closed, so that the phase sensitive amplifier 38 senses a balanced condition between the signals from the lines 37 and 39. As a consequence, the contacts PS1–1 and PS2–1 remain in their normally open positions, while the contacts PS1–2 and PS2–2 remain in their normally closed positions, and the pointer 12 remains in a position relative to its slide-wire 14 corresponding with the preset position of the pointer P–5 relative to its slide-wire SW5. Accordingly, the controller 10 maintains a furnace temperature corresponding with the preset position of the pointer P–5 for a predetermined period of time set on the timer T. Thus, the line P–5 to T in FIG. 2 is horizontal. After the elapse of such period of time, the signal from the timer T to the normally closed contacts 76 is discontinued, with the result that the contacts return to their normally closed positions, and, because the contacts PS1–2 and PS2–2 are closed, the motor 68 is again energized to advance the switch 74 to the position first above described, where the contacts RS1–1, RS2–1 and RS3–1 are closed.

The phase sensitive amplifier 38 is one which generates a signal at one outlet post when it senses a condition of unbalance in one direction between the lines 37 and 39, and a signal at a second outlet post when it senses a condition of unbalance in the opposite direction between the lines 37 and 39. The use of the signal from one of these outlet posts to close the normally open contacts PS1–1 and to open the normally closed contacts PS1–2, during a heating cycle, has previously been described. The signal from the other outlet post of the amplifier 38 is connected to the contact PS2–1 and to the contact PS2–2. When the pointer 12 is at a "hot" position (corresponding with the preset position of the pointer P–5), the condition of unbalance sensed relative to the pointer P–1 is in the opposite direction, with the result that the contacts PS2–1 are closed and the contacts PS2–2 are opened. Closing of the contacts PS2–1 places the reverse winding 46 of the motor 16 in circuit, and the pointer 12 is driven to the left toward a low temperature position corresponding with the preset position of the pointer P–1. The furnacing cycle is completed, and the controller 10, operating in its normal manner, will supply no further heat because the pointer 12 calls for a temperature below the actual furnace or zone temperature, so that cooling will begin. An operator has considerable leeway in de-energizing the circuit, for example by throwing a manual double pole single throw switch 78.

In view of the discussion of the preceding paragraph, it will be apparent that the circuit of the instant invention can be used, if desired, to provide a terminal furnace cooling at a controlled rate, instead of a constant temperature furnace soak for a fixed period of time. To accomplish this result, it is necessary only to substitute a sixth interruptor and corresponding contacts for the timer T, and to add a sixth slide-wire and pointer and associated contacts. By setting the pointer of the sixth slide-wire to correspond with the minimum temperature desired in the furnace cooling (for example a temperature T–1 as shown in FIG. 2), and by setting the sixth interruptor to cause the pointer 12 to approach a position corresponding with the temperature T–1 at a required rate, such controlled furnace cooling is substituted for the terminal constant temperature soak. If desired, any of the pointers P–2 through P–5 can also be set at a position corresponding with a temperature lower than that of the preceding pointer, so that the signal from the phase sensitive amplifier 38 will close the contact PS2–1 and open the contact PS2–2, with the result that the pointer 12 is driven at a rate determined by the operative one of the interruptors I–2 through I–5 to a position corresponding with such "lower temperature." It will be appreciated that the pointer 12 may go beyond a "balanced" position at the end of either a "heating" or a "cooling" phase, but that, in such case, the circuit will function to cause a reversal of its direction and movement toward "balance."

The rotary index switch 74 can be operated by a Geneva movement and move from one to the next index position upon one complete rotation of the armature of the motor 68. A limit switch LS1 is shown in FIG. 1 operated by a cam attached to the shaft of the motor 68 and is closed shortly after the motor is actuated. This connects the lines 62 and 64 to assure one complete rotation of the shaft of the motor 68, even though one of the relay contacts PS1–2 and PS2–2 should open. A plurality of sequentially operated relays can be employed in place of the rotary switch 74 and the motor 68. A plurality of switch contacts RS4–1 to RS4–6, each of which is in series with a correspondingly numbered toggle switch TS–1 to TS–6, is provided in the circuit of FIG. 1 between the lines 62 and 64. Each of the contacts RS4 is closed by the switch 74, in sequence, contacts RS4–1 being closed at the same time as contacts RS1–1, RS2–1 and RS3–1, contacts RS4–2 at the same time as contacts RS1–2, RS2–2 and RS3–2, etc. However, closing of any of the contacts in this series has no effect upon the operation unless a corresponding toggle switch TS1 to TS6 is also closed. If one of the toggle switches is closed, current will continue to be supplied to the motor 68, through the closed toggle switch and the corresponding contacts RS4, when closed, even though the phase sensitive amplifier senses a condition of unbalance so that one of the contacts PS1–2 and PS2–2 is opened. As a consequence, the indexing switch 74 will be driven to the next succeeding positon. Thus, any of the toggle switches TS1 to TS6 can be closed to cause the circuit to skip any phase of a cycle. Also, any phase can be skipped in a few seconds by setting its pointer P–1 to P–5 at a position on its associated slide-wire SW1 to SW5 corresponding with the position of the preceding pointer on its slide-wire. In addition, in case of power failure, for example, it may be desirable to set the furnace back to an earlier part of the cycle if it has cooled off. For this purpose, a pushbutton PB1 is provided between the lines 62 and 64 for manual operation to supply current to the motor 68 to drive the index switch 74 to a desired position.

In case of power failure, or if for any other reason current should be cut off to the entire circuit, a time delay relay TDR in a line 80 having contacts TDR–1 in the line 66 is provided. The time delay relay is actuated when current is turned back on and holds the contacts TDR–1 open for a period of about a minute. This enables the tubes in the phase sensitive amplifier 38 to warm up and assures proper functioning thereof before current is supplied to the motors 16 and 68. Otherwise, the contacts PS1–2 and PS2–2 may not function properly and may cause the motor 68 prematurely to index the switch 74.

It will be appreciated that a condition of balance can be reached and the contacts PS1–2 and PS2–2 closed to index the switch 74 when the contacts of an operative interruptor I–1 to I–5 are closed. In such an instance, the contacts I1–1 to I1–5 corresponding with such interruptor would not necessarily be opened upon de-energization of the interruptor. To prevent a run-away of the indicator pointer 12 which might be caused by closed contacts I1–1 to I1–5 of an inoperative interruptor, the circuit of FIG. 1 includes the relay contacts RS2–1 to RS2–5. These contacts open the lines in which the contacts of the series I1–1 to I1–5 of all inoperative interruptors are located. Thus, even if some of the interruptor contacts are closed, no current will flow through the lines in which they are located, unless the contacts RS2–1 to RS2–5 in series therewith are also closed. Equivalents can be employed for most of the components of a circuit in accordance with the invention. For example, a plurality of sequentially-operated relays can be used in place of the motor 68 and the rotary switch 74. Also, if the motor is a variable speed type, a plurality of variable resistances can be used in place of the interruptors I–1 to I–5. They can be subtsituted for the interruptor contacts I1–1 to I1–5 in the lines connecting the lines 52 and 54 and can be individually manually set to obtain desired rates of movement of the pointer 12. In this instance, the interruptors I–1 to I–5, the lines 58–1 to 58–5, the lines 60–1 to 60–5, and the contacts RS3–1 to RS3–5 can be eliminated. In addition, other means can be employed to sense conditions of balance and unbalance between the position of the pointer 12 and the position of the operative pointer P–1 to P–5.

In its essential details, the invention contemplates a program controller for moving an indicator along a predetermined path representing all conditions of a variable to be controlled. The controller includes means for moving the indicator in at least one direction along the path, means for generating a signal, preferably electrical, having a measurable characteristic, preferably magnitude, which is a function of the position of the indicator on the path, a plurality of means, each of which, when operative, controls the rate at which the indicator is moved, a plurality of second signal generating means, each of which generates a signal, preferably electrical, having a measurable characteristic, preferably magnitude, corresponding to that of the first generating means when the indicator is at a predetermined position on the path. The controller also includes control signal generating means effective to receive signals from the first generating means and from one of the second generating means and to generate a control signal in response to at least one of the following conditions: (1) the measurable characteristic of the first of the received signals predominates over the measurable characteristic of the second, and (2) the characteristic of the second is at least equal to that of the first. The control signal generating means also is effective to change its control signal generating characteristics in response to a change from one of the conditions to the other. Preferably, such generator is effective to generate a first control signal when the first received signal predominates over the second, and a second control signal when the second received signal predominates over the first, but is ineffecitve to generate a control signal when the two received signals are balanced. In addition, the controller includes means effective in each of a plurality of positions to make an operable connection between the indicator moving means and one of the indicator rate control means, while preventing such an operable connection with the others of the indicator control means, means effective in each of a plurality of positions to connect one of the second signal generating means with the control signal generating means, while preventing such a connection with the others of the second signal generating means, and means effective to change the last two means from position to position to connect the indicator rate control means in a predetermined sequence and to connect the second signal generating means in a predetermined sequence in response to a change in the control signal generating characteristics of the control signal generating means.

I claim:

1. A program controller for moving an indicator along a predetermined path representing all conditions of a variable to be controlled comprising, in combination, means for moving the indicator in both directions along the path, means for generating a signal having a magnitude which is a function of the position of the indicator on the path, a plurality of means, each of which, when operatively connected, is effective to control the rate at which the indicator is moved by said indicator moving means, a plurality of second signal generating means each of which is effective to generate a signal having a magnitude corresponding with that of said first generating means when the indicator is at a predetermined position on the path, control signal generating means effective to receive signals from said first generating means and from one of said second generating means, and to generate a first control signal when the magnitude of a first of the received signals is greater than the magnitude of the second, and a second control signal when the magnitude of the second is greater than that of the first, and ineffective to generate a signal when the received signals are balanced, means effective in each of a plurality of positions to make an operable connection between said indicator moving means and one of said indicator rate control means, while preventing such an operable connection with the others of said indicator rate control means, means effective in each of a plurality of positions to connect one of said second signal generating means with said control signal generating means, while preventing such a connection with the others of said second signal generating means, means effective to change said last two means from a given position to a different position to connect said indicator rate control means in a predetermined sequence and to connect said second signal generating means in a predetermined sequence whenever no signal is generated by said control signal generating means, control means operatively associated with said indicator moving means, and effective in cooperation therewith, in response to the first control signal, to predetermined movement of said indicator moving means in a direction effective to increase the magnitude of the second signal received by said control signal generating means relative to the magnitude of the first such received signal, and control means operatively associated with said indicator moving means, and effective in cooperation therewith, in response to the second control signal, to predetermine movement of said indicator moving means in a direction effective to increase the magnitude of the first control signal received by said control signal generating means relative to the magnitude of the second such received signal.

2. Apparatus as claimed in claim 1 wherein said signal generating means and all of said second signal generating means are slide-wires with cooperating pointers, and wherein an electromotive force is applied to each of said slide-wires to generate the respective signals.

3. Apparatus as claimed in claim 2 wherein all of said slide-wires are connected in parallel.

4. Apparatus as claimed in claim 3 wherein all of said slide-wires are substantially identical.

5. A program controller for moving an indicator along a predetermined path representing all conditions of a variable to be controlled comprising, in combination, means for moving the indicator in both directions along the path, means for generating a signal having a magnitude which is a function of the position of the indicator on the path, a plurality of means, each of which, when operatively connected, is effective to control the rate at which the indicator is moved by said indicator moving means, a plurality of second signal generating means each of which is effective to generate a signal having a magnitude corresponding with that of said first generating means when the indicator is at a predetermined position on the path, control signal generating means effective to receive signals from said first generating means and from one of said second generating means, and to generate a first control signal when the magnitude of a first of the received signals is greater than the magnitude of the second, and a second control signal when the magnitude of the second is greater than that of the first, and ineffective to generate a signal when the received signals are balanced, means effective in each of a plurality of positions to make an operable connection between said indicator moving means and one of said indicator rate control means, while preventing such an operable connection with the others of said indicator rate control means, means effective in each of a plurality of positions to connect one of said second signal generating means with said control signal generating means, while preventing such a connection with the others of said second signal generating means, and means effective to change said last two means from a given position to a different position to connect said indicator rate control means in a predetermined sequence and to connect said second signal generating means in a predetermined sequence whenever no signal is generated by said control signal generating means.

6. A program controller for moving an indicator along a predetermined path representing all conditions of a variable to be controlled comprising, in combination, means for moving the indicator in at least one direction along the path, means for generating a signal having a magnitude which is a function of the position of the indicator on the path, a plurality of means, each of which, when operatively connected, is effective to control the rate at which the indicator is moved by said indicator moving means, a plurality of second signal generating means each of which is effective to generate a signal having a magnitude corresponding with that of said first generating means when the indicator is at a predetermined position on the path, control signal generating means effective to receive signals from said first generating means and from one of said second generating means, and to generate a control signal in response to at least one of the following conditions: (1) the magnitude of a first of the received signals is greater than the magnitude of the second and (2) the magnitude of the second is at least as great as that of the first, said control signal generating means also being effective to change its control signal generating characteristics in response to a change from one of said conditions to the other, means effective in each of a plurality of positions to make an operable connection between said indicator moving means and one of said indicator rate control means, while preventing such an operable connection with the others of said indicator rate control means, means effective in each of a plurality of positions to connect one of said second signal generating means with said control signal generating means, while preventing such a connection with the others of said second signal generating means, and means effective to change said last two means from a given position to a different position to connect said indicator rate control means in a predetermined sequence and to connect said second signal generating means in a predetermined sequence in response to a change in the control signal generating characteristics of said control signal generating means.

7. A program controller for moving an indicator along a predetermined path representing all conditions of a variable to be controlled comprising, in combination, means for moving the indicator in at least one direction along the path, means for generating a signal having a measurable characteristic which is a function of the position of the indicator on the path, a plurality of means, each of which, when operatively connected, is effective to control the rate at which the indicator is moved by said indicator moving means, a plurality of second signal generating means each of which is effective to generate a signal having a measurable characteristic corresponding with that of said first generating means when the indicator is at a predetermined position on the path, control signal generating means effective to receive signals from said first generating means and from one of said second generating means, and to generate a control signal in response to at least one of the following conditions: (1) the measurable characteristic of a first of the received signals predominates over that of the second and (2) the measurable characteristic of the second is at least as great as that of the first, said control signal generating means also being effective to change its control signal generating characteristics in response to a change from one of the said conditions to the other, means effective in each of a plurality of positions to make an operable connection between said indicator moving means and one of said indicator rate control means, means effective in each of a plurality of positions to connect one of said second signal generating means with said control signal generating means, and means effective to change said last two means from position to position in response to a change in the control signal generating characteristics of said control signal generating means.

8. A program controller for moving an indicator along a predetermined path representing all conditions of temperature to be controlled in at least a zone of a furnace, said controller comprising, in combination, a first slide-wire, means for moving the indicator in both directions along the path, and effective to move said indicator along said slide-wire from a first end corresponding with a low temperature position for said indicator to a second end corresponding with a high temperature indicator position, a plurality of second slide-wires, each of which is substantially identical with said first slide-wire, a plurality of second pointers, each of which is slidable along one of said second slide-wires from a first end to a second end, means for applying an electromotive force from the first end to the second end of said first slide-wire, and for applying the same electromotive force from the first end to the second end of each of said second slide-wires, said means being effective to connect said first slide-wire and each of said second slide-wires in parallel with one another, control signal generating means effective to receive signals from said indicator and from one of said second pointers, and to generate a first control signal when the magnitude of the signal received from said indicator is greater than that of the signal received from one of said second pointers, and a second control signal when the magnitude of the signal received from one of said second pointers is greater than that of the signal received from said indicator, and ineffective to generate a control signal when the two received signals are of equal magnitude, switch means effective in each of a plurality of positions to prevent the reception of a signal by said control signal generating means from all but a predetermined one of said second pointers, and movable from position to position to enable the reception of the signal from each of said second pointers in a predetermined sequence by said control signal generating means, a plurality of means, each of which, when operatively connected, is effective to control the rate at which the indicator is moved by said indicator moving means, means effective in each of a plurality of positions to make an operable connection between said indicator moving means and one of said indicator rate control means, while preventing such an operable connection with the others of said indicator rate control means, and movable from position to position to enable the making of such an operable connection with each of said rate control means in a predetermined sequence, means effective to change said last-named means and said switch means from a given position to a different position whenever no signal is generated by said control signal generating means, control means operatively associated with said indicator moving means, and effective, in cooperation therewith, in response to the first control signal, to predetermine movement of said indicator moving means in a direction effective to reduce the magnitude of the signal from said indicator, and control means operatively associated with said indicator moving means, and effective, in cooperation therewith, in response to the second control signal, to predetermine movement of said indicator moving means in a direction effective to increase the magnitude of the signal from said indicator.

9. A program controller for controlling a variable according to a predetermined cycle, said controller comprising an instrument having a first signal-generating means including indicating means set at a position corresponding to a predetermined magnitude of said variable, said instrument being effective to change the magnitude of said variable toward the magnitude set by said first generating means, a plurality of second signal-generating means each of which includes means manually set at a position corresponding to a predetermined magnitude of said variable, each of said second signal-generating means being effective to generate a second signal corresponding to its manually set position, when operatively associated with said first signal-generating means, means responsive to the relative magnitude of the first signal and the second signal of an operatively connected one of said plurality of second signal-generating means for moving said indicating means of said first signal-generating means toward a position corresponding to a variable magnitude equal to the variable magnitude corresponding to the position of the manually-set means of the operatively connected second signal-generating means and for stopping the movement of said indicating means of said first signal-generating means when its signal is substantially balanced with the signal of the operatively connected second signal-generating means, and means responsive to the first and second signals for disconnecting the operatively connected second signal-generating means and for operatively connecting another of the second signal-generating means when said first and second signals have balanced and the magnitude of the variable equals the magnitude set by the operatively connected second signal-generating means.

10. A controller according to claim 9 and means associated with each of the second signal-generating means for changing the rate at which said moving means changes the position of said indicating means of said first signal-generating means, and means for connecting another rate-changing means with said moving means when another of the second signal-generating means is operatively connected with said first signal-generating means.

11. A program controller for controlling a variable according to a predetermined cycle, said controller comprising an instrument having a first signal-generating means including indicating means and a first slide-wire, said indicating means and said slide-wire being positioned relative to one another to correspond to a predetermined magnitude of said variable, said instrument being effective to change the magnitude of said variable toward the magnitude set by said first generating means, a plurality of second signal-generating means each of which includes means positioned to correspond to a predetermined magnitude of said variable, each of said second signal-generating means being effective to generate a second signal corresponding to its position, when operatively associated with said first signal-generating means, means responsive to the relative magnitude of the first signal and the second signal of an operatively connected one of said plurality of second signal-generating means for effecting relative movement between said indicating means and said first slide-wire of said first signal-generating means to change the relative positions of said indicating means and said first slide-wire toward a position corresponding to a variable magnitude equal to the variable magnitude corresponding to the positioned means of said operative second signal-generating means and for stopping the relative movement of said indicating means and said first slide-wire when the signal of said first signal-generating means is substantially balanced with the signal of the operatively connected second signal-generating means, and means responsive to the first and second signals for disconnecting the operatively connected second signal-generating means and for operatively connecting another of the second signal-generating means when said first and second signals have balanced and the magnitude of the variable equals the magnitude set by the operatively connected second signal-generating means.

12. A program controller comprising, in combination, a first slide-wire, an indicator, the relative positions of said slide wire and indicator representing all conditions of temperature to be controlled in at least a zone of a furnace, means effective to cause relative movement between said indicator and said slide-wire between a first end of said slide-wire corresponding with a low temperature position for said indicator and a second end corresponding with a high temperature indicator position, a plurality of second slide-wires each of which is substantially identical with said first slide-wire, a plurality of second indicators, each of which is capable of movement relative to one of said second slide-wires between a first end and a second end, means for applying an electromotive force from the first end to the second end of said first slide-wire, and for applying the same electromotive force from the first end to the second end of each of said second slide-wires, said means being effective to connect said first slide-wire and each of said second slide-wires in parallel with one another, control signal-generating means effective to receive signals from said first indicator and from one of said second indicators, and to generate a first control signal when the magnitude of the signal received from said first indicator is greater than that of the signal received from one of said second indicators, and a second control signal when the magnitude of the signal received from one of said second indicators is greater than that of the signal received from said first indicator, and ineffective to generate a control signal when the two received signals are of equal magnitude, switch means effective in each of a plurality of positions to prevent the reception of a signal by said control signal-generating means from all but a predetermined one of said second indicators, and movable from position to position to enable the reception of the signal from each of said second indicators in a predetermined sequence by said control signal-generating means, a plurality of means, each of which, when operatively connected, is effective to control the rate of relative movement between said first indicator and said first slide-wire by said relative movement means, means effective in each of a plurality of positions to make an operable connection between said relative movement means and one of said rate control means, while preventing such an operable connection with the others of said rate control means, and movable from position to position to enable the making of such an operable connection with each of said rate control means in a predetermined sequence, means effective to change said last-named means and said switch means from a given position to a different position whenever no signal is generated by said control signal-generating means, control means operatively associated with said relative movement means, and effective, in cooperation therewith, in response to the first control signal, to predetermine movement of said relative movement means in a direction effective to reduce the magnitude of the signal from said first indicator, and control means operatively associated with said relative movement means, and effective, in cooperation therewith, in response to the second control signal, to predetermined movement of said relative movement means in a direction effective to increase the magnitude of the signal from said first indicator.

13. A program controller according to claim 12 wherein said switch means comprises a rotary index switch.

References Cited in the file of this patent

UNITED STATES PATENTS

| | | |
|---|---|---|
| 1,925,463 | Schmidt | Sept. 5, 1933 |
| 2,135,991 | Nessell | Nov. 8, 1938 |
| 2,249,844 | Martin | July 22, 1941 |
| 2,359,160 | Sauter | Sept. 26, 1944 |
| 2,631,265 | Calegrove | Mar. 10, 1953 |
| 2,801,799 | McCollock | Aug. 6, 1957 |
| 2,871,869 | Howard | Feb. 3, 1959 |
| 2,917,640 | Batterman et al. | Dec. 15, 1959 |

OTHER REFERENCES

Eckman: "Principles of Industrial Process Control" (pages 199–202), published 1945 by John Wiley and Sons, New York, N.Y.